(12) United States Patent
Huang et al.

(10) Patent No.: US 9,462,016 B2
(45) Date of Patent: Oct. 4, 2016

(54) VIEWING SHARED DOCUMENTS IN A SHARING SESSION

(71) Applicant: Cisco Technology, Inc., San Jose, CA (US)

(72) Inventors: Haihua Huang, Jiangsu (CN); Hua Ouyang, Jiangsu (CN); Ling Chen, Jiangsu (CN); Jun Xiao, Jiangsu (CN); Dapeng Sun, Jiangsu (CN); Yong Qian, Jiangsu (CN)

(73) Assignee: Cisco Technology, Inc., San Jose, CA (US)

(*) Notice: Subject to any disclaimer, the term of this patent is extended or adjusted under 35 U.S.C. 154(b) by 289 days.

(21) Appl. No.: 13/970,860

(22) Filed: Aug. 20, 2013

(65) Prior Publication Data

US 2015/0058748 A1    Feb. 26, 2015

(51) Int. Cl.
| | |
|---|---|
| *G06F 3/00* | (2006.01) |
| *H04L 29/06* | (2006.01) |
| *G06F 3/0481* | (2013.01) |
| *G06Q 10/10* | (2012.01) |

(52) U.S. Cl.
CPC ........... *H04L 65/403* (2013.01); *G06F 3/0481* (2013.01); *G06Q 10/101* (2013.01)

(58) Field of Classification Search
CPC .......................... G06F 17/30165; H04L 29/08
See application file for complete search history.

(56) References Cited

U.S. PATENT DOCUMENTS

| | | | | |
|---|---|---|---|---|
| 5,737,599 | A * | 4/1998 | Rowe ................... | G06F 17/211 |
| 7,664,870 | B2 * | 2/2010 | Baek ................. | G06F 17/30905 |
| | | | | 709/203 |
| 8,782,534 | B2 * | 7/2014 | Bryant .................. | G06Q 10/10 |
| | | | | 715/751 |
| 2003/0189601 | A1 * | 10/2003 | Ben-Shachar ......... | G06Q 10/10 |
| | | | | 715/810 |
| 2003/0220973 | A1 | 11/2003 | Zhu et al. | |
| 2006/0161622 | A1 * | 7/2006 | Montgomery ........ | G06F 3/1454 |
| | | | | 709/204 |
| 2008/0091778 | A1 * | 4/2008 | Ivashin .................. | G06Q 10/10 |
| | | | | 709/204 |
| 2010/0076946 | A1 * | 3/2010 | Barker .............. | G06F 17/30194 |
| | | | | 707/705 |
| 2013/0061335 | A1 * | 3/2013 | Schwabe ............. | G06F 21/6218 |
| | | | | 726/28 |
| 2013/0305167 | A1 * | 11/2013 | Bastide ............... | H04L 65/1069 |
| | | | | 715/753 |
| 2014/0033067 | A1 * | 1/2014 | Pittenger ............... | G06F 21/606 |
| | | | | 715/751 |

(Continued)

OTHER PUBLICATIONS

U.S. Appl. No. 13/746,428, filed Jan. 22, 2013, entitled "Allowing Web Meeting Attendees to Navigate Content during a Presentation."

(Continued)

*Primary Examiner* — Dino Kujundzic
(74) *Attorney, Agent, or Firm* — Edell, Shapiro & Finnan, LLC

(57) ABSTRACT

In a sharing session between a presenter and several attendees, the presenter can share any type of document quickly and without substantial prior preparation. The presenter's device identifies an active document-sharing window within the desktop sharing environment, and detects if there is a shared document in the active window. The presenter's device creates a framework for any detected shared document that is transmitted to each of the attendee devices. The framework contains information about the pages in the shared document, such that an attendee device can request a specific page in the shared document. At least the first page of the shared document is rendered to a page image and transmitted to the attendee devices. Upon request from an attendee device, page images of any of the remaining pages may be sent to the attendee device, allowing each attendee to view a different page than the presenter.

26 Claims, 16 Drawing Sheets

(56) References Cited

U.S. PATENT DOCUMENTS

| | | | | |
|---|---|---|---|---|
| 2014/0033265 | A1* | 1/2014 | Leeds | G06F 21/10 |
| | | | | 726/1 |
| 2015/0007057 | A1* | 1/2015 | Zhu | H04L 67/38 |
| | | | | 715/753 |

OTHER PUBLICATIONS

U.S. Appl. No. 12/205,751, filed Sep. 5, 2008, entitled "Optimizing Desktop Sharing for Wireless Clients during Networked Collaboration."

U.S. Appl. No. 13/932,208, filed Jul. 1, 2013, entitled "System and Method for Application Sharing."

Behera, et al., "Looking at projected documents: Event detection & document identification," IEEE International Conference on Multimedia and Expo (ICME), Jun. 2004, pp. 1-4.

PrecisionIR Group, "IR Webcast Options," PrecisionIR.com, 2010, pp. 1-3.

Macromedia, Breeze Meeting User Guide for Meeting Hosts and Presenters, retrieved from http://download.macromedia.com/pub/documentation/en/breeze/5/meeting_ug_presenters.pdf, on Aug. 20, 2013, 130 pages.

* cited by examiner

VIEWING SHARED DOCUMENTS IN A SHARING SESSION

TECHNICAL FIELD

The present disclosure relates to sharing of documents in a sharing session such as in a desktop sharing environment.

BACKGROUND

In on-line/web-based meetings involving desktop sharing, documents or materials displayed on a presenter's device can be shared with a plurality of meeting attendees by simultaneously displaying the same materials on the attendees' devices. Typically, the attendees are able to concurrently view essentially the same material that is being displayed on the presenter device at any given time. However, some attendees may want to move backward and forward within a shared document while the presenter is displaying and discussing a particular page of the document such that different attendees simultaneously view various different portions of the document relative to the presenter and each other.

While some capabilities exist to allow an attendee to maneuver within a shared document, document sharing is currently limited to specific document types, and the shared document must be uploaded in its entirety to a central server accessible to all of the attendees and then downloaded in its entirety to each attendee prior to viewing any portion of the document. In this context, there is no feedback to the presenter about which specific portion of a document each attendee is currently viewing.

DESCRIPTION OF EXAMPLE EMBODIMENTS

Overview

Presented herein are techniques to enable a sharing session between a presenter and several attendees, wherein the presenter can share any type of document quickly and without substantial prior preparation. The presenter's device identifies an active document-sharing window within the desktop sharing environment based on a number of criteria (e.g., the degree of interaction or activity by the presenter and/or attendees associated with the window). The presenter's device detects if there is a shared document in the active window and creates a framework for any detected shared document that is transmitted to each of the attendee devices. The framework contains information about the pages in the shared document, such that an attendee device can request a specific page in the shared document. At least the first page of the shared document is rendered to a page image and transmitted to the attendee devices. Upon request from an attendee device, any of the remaining pages may be rendered to page images and sent to the attendee device, allowing each of the attendees to view a different page than the presenter at a given point in time.

Example Embodiments

Networked sharing of data files and information between people can take several forms. One typical form of sharing is a presentation in which a presenter shares a document with a group of attendees and talks through the information presented in the document. The document may be shared directly in a document sharing system or shared as part of a specific application. Alternatively, the document may be shared as part of a desktop sharing system. While the system will be discussed as a presentation in a desktop sharing environment, other embodiments are envisioned. For example, the techniques described herein may also be used within a shared application of a shared document. Further, the term "desktop sharing" may be applicable in computing devices that are not desktop computers. Desktop sharing, as used herein, is used to convey a computing environment with windows that are shared between at least two computing devices of any type.

Figure 1:
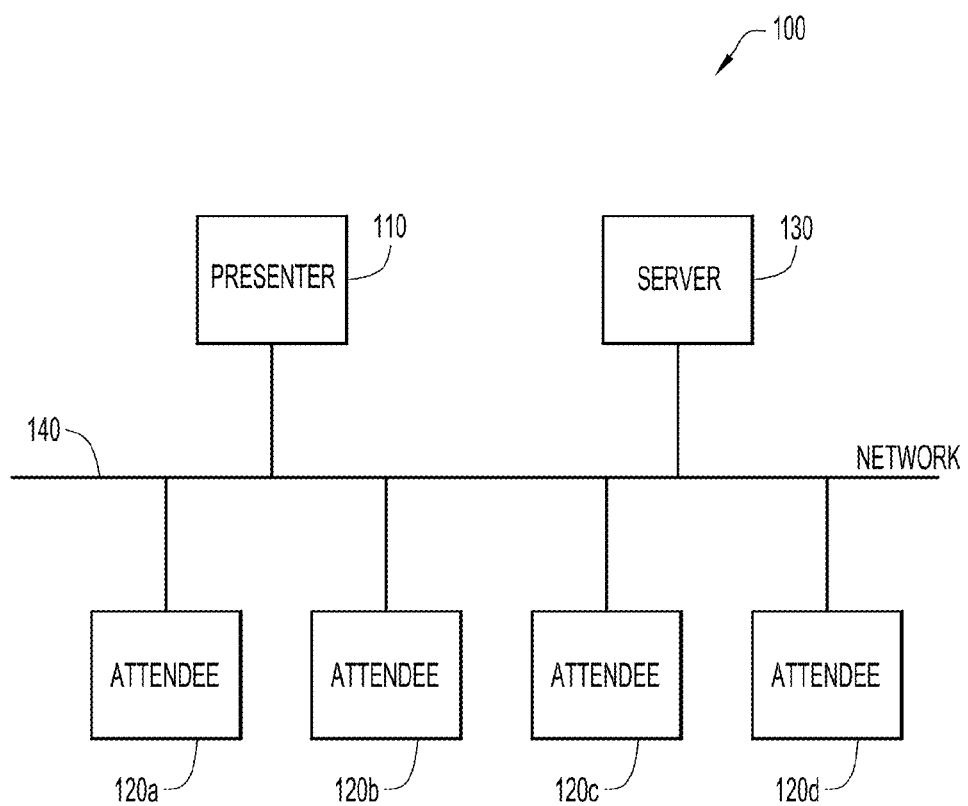
FIG. 1 is a block diagram of a networked desktop sharing system.

Referring to FIG. 1, sharing system 100 enables presenter device 110 to share documents and information with attendee devices 120a, 120b, 120c, and 120d across network 140. Only four attendee devices are shown in FIG. 1, but any number of attendee devices may be included in system 100, and attendee devices will generally be denoted 120, particularly in cases where only one attendee device is needed to illustrate a particular feature. Presenter device 110 and attendee devices 120a-d may take a variety of forms, including a desktop computer, laptop computer, mobile/cellular phone, tablet computer, etc. Network 140 may be any type of network (e.g., Internet, intranet, LAN, WAN, wired, wireless, etc.) that connects computing devices. Server 130 may optionally be used, for example, to mediate transactions between presenter device 110 and attendee device 120. Server 130 may also perform caching or other time/bandwidth saving techniques.

One example of sharing a document would be a group training session. In this specific example, Carolyn has a Microsoft Power Point presentation on her computer, and would like to talk through the training while going through the slides of the presentation with the attendees James, Harold, and Tom. In sharing system 100, Carolyn's computer is presenter device 110, while James, Harold, and Tom have computers corresponding to attendee devices 120a, 120b, and 120c, respectively. All of their computers are connected by an intranet corresponding to network 140. By using the techniques described herein, Carolyn can start a desktop sharing session and share her desktop with the attendees, including the Power Point document. In this way, the training session can quickly begin without waiting for Carolyn to upload the document and for all of the other co-authors to download the document to their respective computers.

Figure 2:
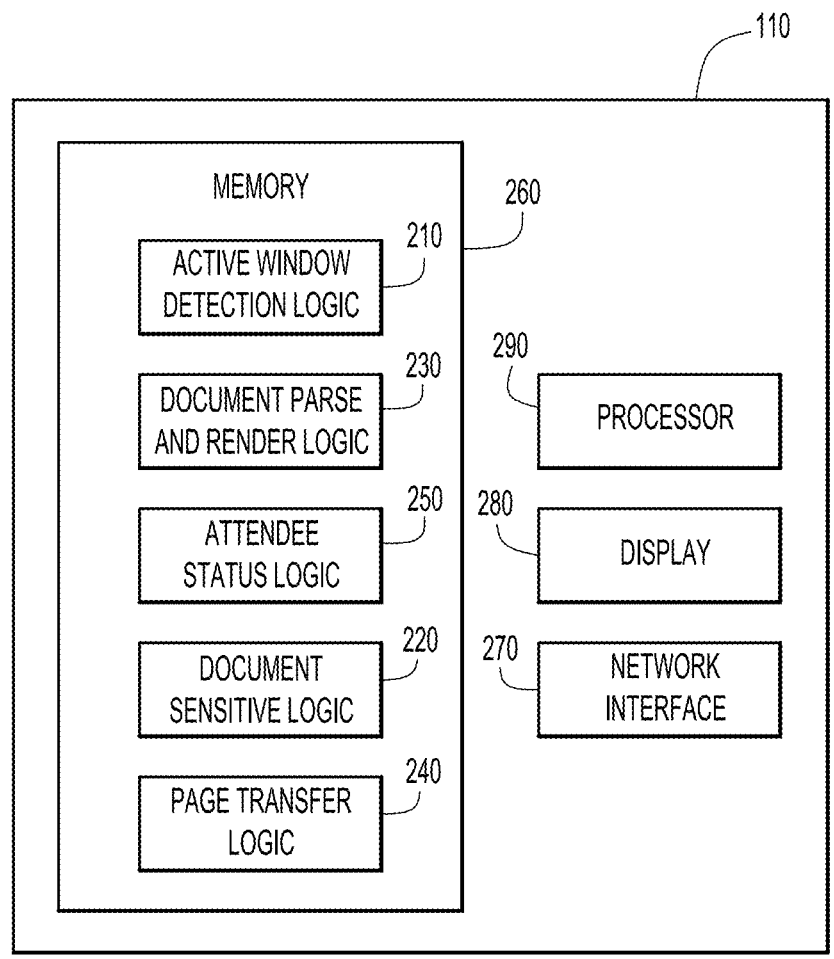
FIG. 2 is an example block diagram of a user device configured as a presenter device in the desktop sharing system.

FIG. 2 shows one example of a user device 110 that is configurable as a presenter device in sharing system 100. Presenter device 110 includes processor 290 to process instructions relevant to sharing system 100, memory 260 to store data relevant to sharing system 100 (e.g., shared documents, applications, software with processor instructions, etc.), network interface unit (e.g., card) 270 to communicate with other devices over network 140, and display 280 to display the user interface (e.g., a desktop with windows) that the presenter may use in sharing system 100. Memory 260 may comprise read only memory (ROM), random access memory (RAM), magnetic disk storage media devices, optical storage media devices, flash memory devices, electrical, optical, or other physical/tangible (e.g., non-transitory) memory storage devices. The processor 290 is, for example, a microprocessor or microcontroller that executes instructions for implementing the processes of sharing system 100. Thus, in general, the memory 260 may comprise one or more tangible (non-transitory) computer readable storage media (e.g., a memory device) encoded with software comprising computer executable instructions and when the software is executed (by the processor 250) it is operable to perform the operations described herein. In one specific example of user device 110 configured as presenter device 110, memory 260 includes logic 210, 220, 230, 240, and 250 that allow processor 290 to perform specific functions in sharing a document across a desktop sharing environment.

In quickly setting up a sharing session, including a shared document, with attendee devices 120, presenter device 110 provides a framework to attendee devices 120. The framework allows attendee devices 120 to freely move back and forward through a shared document independently from how presenter device 110 moves through the document. To accomplish this, presenter device 110 uses the logic to process the document, as well as receive feedback on how the shared document is being viewed. First, presenter device 110 must identify which window within a shared desktop environment is the active window, and determine whether that window is showing a document. Once a shared document is identified, presenter device 110 needs a way to parse the document and send enough information that attendees do not know that their devices have not actually received the entire document. After attendee devices 120 begin displaying the shared document, presenter device 110 starts receiving feedback from the attendee devices 120 as to which page of the document each device is currently displaying. Presenter device 110 compiles this feedback and displays it to the presenter so that the presenter knows which page each attendee device 120 is displaying.

Referring to FIG. 2, Active Window Detection Logic 210 is responsible for identifying an active sharing window in the desktop sharing environment. This logic may run continuously to detect dynamic changes in the shared desktop. Alternatively, logic 210 may be triggered by a timer to detect changes periodically, while not necessarily running continuously. An active window may be detected by logic 210 through a set of rules that determine the likelihood that a particular window within the overall display is the active window, which should be shared. Some examples of these rules include: evaluating the visible region of the window (e.g., a larger visible region indicates a higher likelihood that the window is active and may want to be shared); evaluating the degree of activity in the window in a recent time period (e.g., a window that has been visible frequently in the past indicates a higher likelihood that the window is active); evaluating the interaction degree of the window (e.g., a window in which the presenter moves/clicks the mouse or uses keyboard actions frequently indicates a higher likelihood that the window is active); and detecting a specific request for a window (e.g., if one of the attendee devices specifically requests content from a particular window, that window can immediately be designated as the active window).

Still referring to FIG. 2, Document Sensitive Logic 220 takes an active window, as determined by Active Window Detection Logic 210, and judges whether a document is shown in the window. If logic 220 determines there is a document in the active window, and that document is to be shared, it determines the file path and locates the document. According to one example, logic 220 determines the application type of a window, and finds the active open file path from the application. Logic 220 may judge the document type (e.g., web page, Microsoft Word, Power Point, Excel, etc.) regardless of using the application type to find the file path of the document.

In the specific training session example introduced previously, Carolyn has shared her desktop with James, Harold, and Tom. Carolyn has made the window with the Power Point document the largest window. The Active Window Detection Logic on Carolyn's computer determines that the window with the Power Point document is most likely to have a document that needs to be shared. The Document Sensitive Logic on Carolyn's computer takes the output from the Active Window Detection Logic (i.e., the window displaying the Power Point document) and determines that the active window is showing a document (i.e., the Power Point document). The Document Sensitive Logic also determines that the document is a Power Point presentation, and records the file path of the document. At this point, Carolyn's computer has found the document that it should prepare to share, but has not actually manipulated the document with regard to the sharing process.

Again referring to FIG. 2, Document Parse and Render Logic 230 takes the document identified by logic 220, parses or divides it into pages and renders each page as a page image. A page, as used herein, is a defined block of data that is a subset of the document. In one example, a page corresponds to the amount of data that will fit on a piece of paper or a single slide from a presentation. However, particularly in document types that do not require these types of breaks, a page may be a block of data of arbitrary length. As long as the parties of the sharing session can determine how to display the document from the pages, the length of the blocks of data in each page can be arbitrarily assigned. In some cases, the pages of the document may overlap and contain redundant information, particularly in document types that do not inherently include logical page breaks (e.g., HTML documents). Once the document is parsed into pages, each page is rendered as a page image that attendee device 120 can display. The output of logic 230 includes page images of the pages in the shared document. If attendee device 120 has received all of the page images in a shared document, then it can display any page or portion of the entire document.

In one example, logic 230 opens the shared document in a separate window, which may be hidden from the presenter's view. Logic 230 uses a standard user interface element, such as a scroll bar or next/previous page button, to divide the document into pages. It then cycles through each page, taking a screen capture image of each page. The screen captures are typically limited to just the window displaying the document, so that extraneous information is not inserted into the image representation of the document. In this example, any document that is normally displayed with the standard user interface element can be easily shared with sharing system 100. In another example, some applications may provide user interface elements that allow logic 230 to create page images of a shared document. In this example, logic 230 "prints" the document to images, with one printed page being a single image. Not all pages are necessarily rendered before the document can start being shared. Logic 230 may begin by rendering only the first page of a document, allowing a faster start to a sharing session, and later rendering any pages that are requested in the sharing session. Once a page is rendered to a page image, it is cached so that presenter device 110 does not need to render the page image for every attendee device 120 that requests that particular page.

In operation, logic 230 creates a framework for the shared document. The framework may describe various attributes of the shared document as it is divided into pages (e.g., the number of pages, the size of the pages, the order of the pages, etc.). The framework does not contain the actual contents of the shared document, and is thus significantly smaller than the shared document itself.

Once again referring to FIG. 2, Page Transfer Logic 240 is responsible for transferring page images to any attendee device 120. Using network interface 270, logic 240 sends page images enabling each attendee device to view any page from the shared document. The data for the page images may be stored on presenter device 110, attendee devices 120, server 130, and/or any other computer readable storage medium connected to network 140. Where the data is stored may be determined by performance and design requirements of each of the components in system 100. The timing of when logic 240 sends each page image, and which page images it sends, may vary depending on the mode that sharing system 100 is in, as will be described further below.

Still referring to FIG. 2, Attendee Status Logic 250 receives view status indications from attendee devices 120 that indicate which page of the shared document an attendee device 120 is currently displaying. It compiles the view status indications to create an attendee status presentation, which is displayed to the presenter. Responsive to an indication that a specific page from the shared document was selected, logic 250 causes the active window to display the specific page. Using this function of logic 250, presenter device 110 can cause the shared document to jump to any page that an attendee device 120 is currently displaying, as described below in greater detail.

Continuing the training session example, after Carolyn's computer finds the Power Point document to share, the Document Parse and Render Logic on her computer begins the process of preparing the document for sharing. Since a Power Point document breaks into logical pages (i.e., slides), dividing the document into pages is a simple definition. Carolyn's computer renders each page/slide as an image by creating a screen capture of each slide as it appears in the active window. Carolyn's computer also creates a basic framework of the document that includes the number of slides in the presentation. In order to get the training presentation started more quickly, only the first slide is rendered at the beginning of the training session, with the remaining slides being rendered as Carolyn begins talking through the first slide. After processing by the Document Parse and Render Logic, Carolyn's computer has the initial pieces of data (i.e., the framework and an image of the first slide) to send to the attendees in order to start the training session. The Page Transfer Logic on Carolyn's computer begins the training session by sending the framework and the image of the first slide to James, Harold, and Tom at their respective computers.

After the training session has begun and James, Harold, and Tom have started viewing pages, their respective computers send feedback messages to the Attendee Status Logic on Carolyn's computer with which page the computer is displaying. The Attendee Status Logic takes all of the feedback messages and compiles them into a presentation that shows that James's and Harold's computers are displaying the fifth page of the document and Tom's computer is displaying the twelfth page.

Referring now to FIG. 3 and FIGS. 4A-4C, simulated screenshots of the display and user interface on presenter device 110 and attendee devices 120 show some examples of the features of sharing system 100 as it relates to a desktop sharing environment. Screenshot 300 shows the user interface on presenter device 110. In this example, display 280 shows desktop background 310 with windows 320 and 330. Window 320 is active and is displaying a page of a shared document, while window 330 is in the background. Sharing indicator 340 shows that presenter device 110 is sharing its desktop. Page counter 350 in window 320 indicates which page is currently being displayed to the presenter. Scrollbar 360 allows the presenter to scroll through the document in active window 320.

Figure 4A:
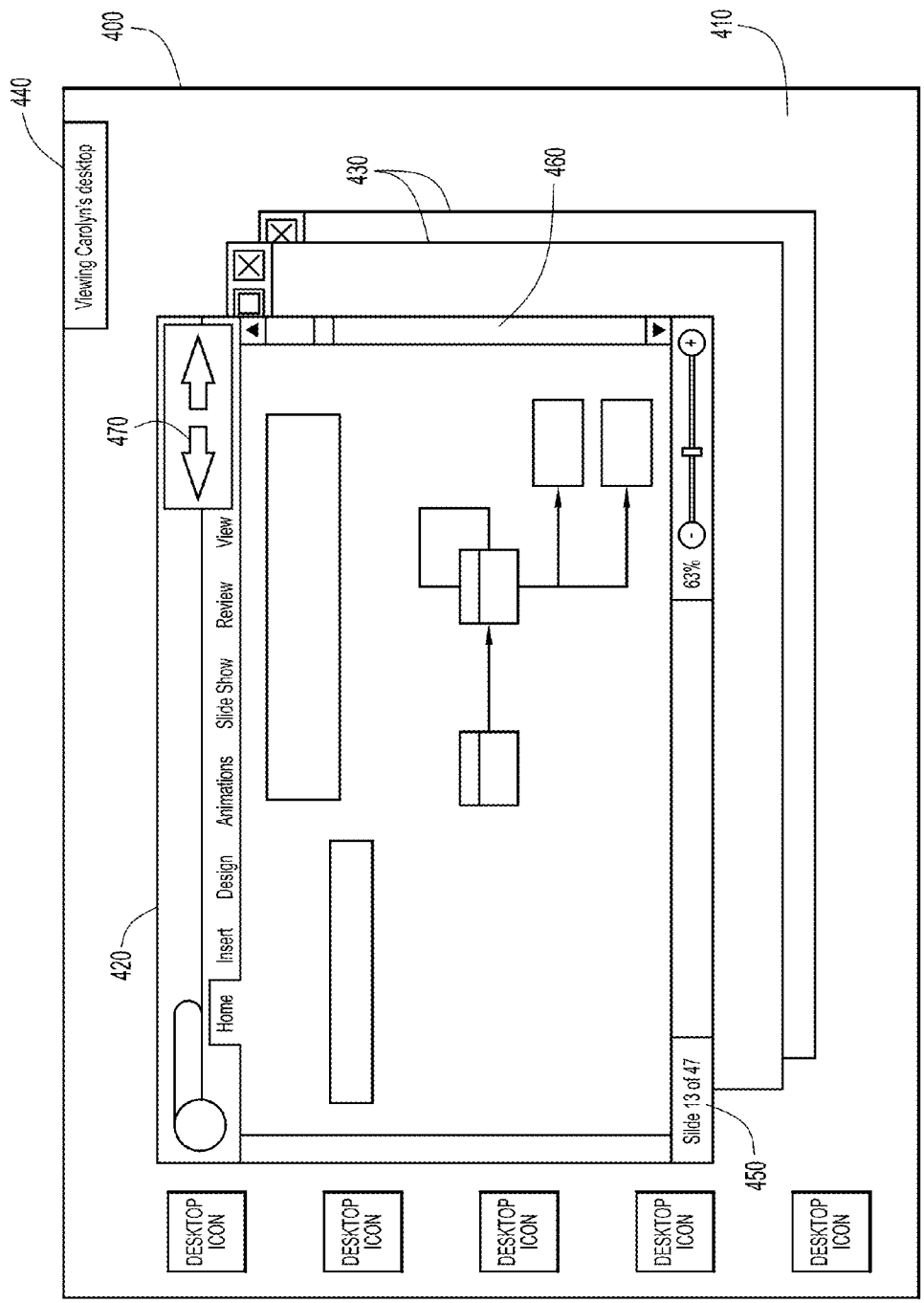
FIG. 4A is a simulated screenshot from an attendee's device using the desktop sharing system to view a page from the shared document that is different from the page of the shared document simultaneously being displayed on the presenter's device.

Screenshot 400, shown in FIG. 4A, shows the user interface on attendee device 120a. In this example, the display of attendee device 120a shows desktop background 410 with shared windows 420 and 430. Shared window 420 contains the document that is currently being actively shared. Sharing indicator 440 shows that attendee device 120a is displaying the shared desktop from presenter device 110. Page counter 450 in window 420 indicates which page is currently being displayed on attendee device 120a. User interface elements such as scroll bar 460 and previous/next page buttons 470 allow attendee device 120a to request a specific page of the shared document from presenter device 110.

Figure 4B:
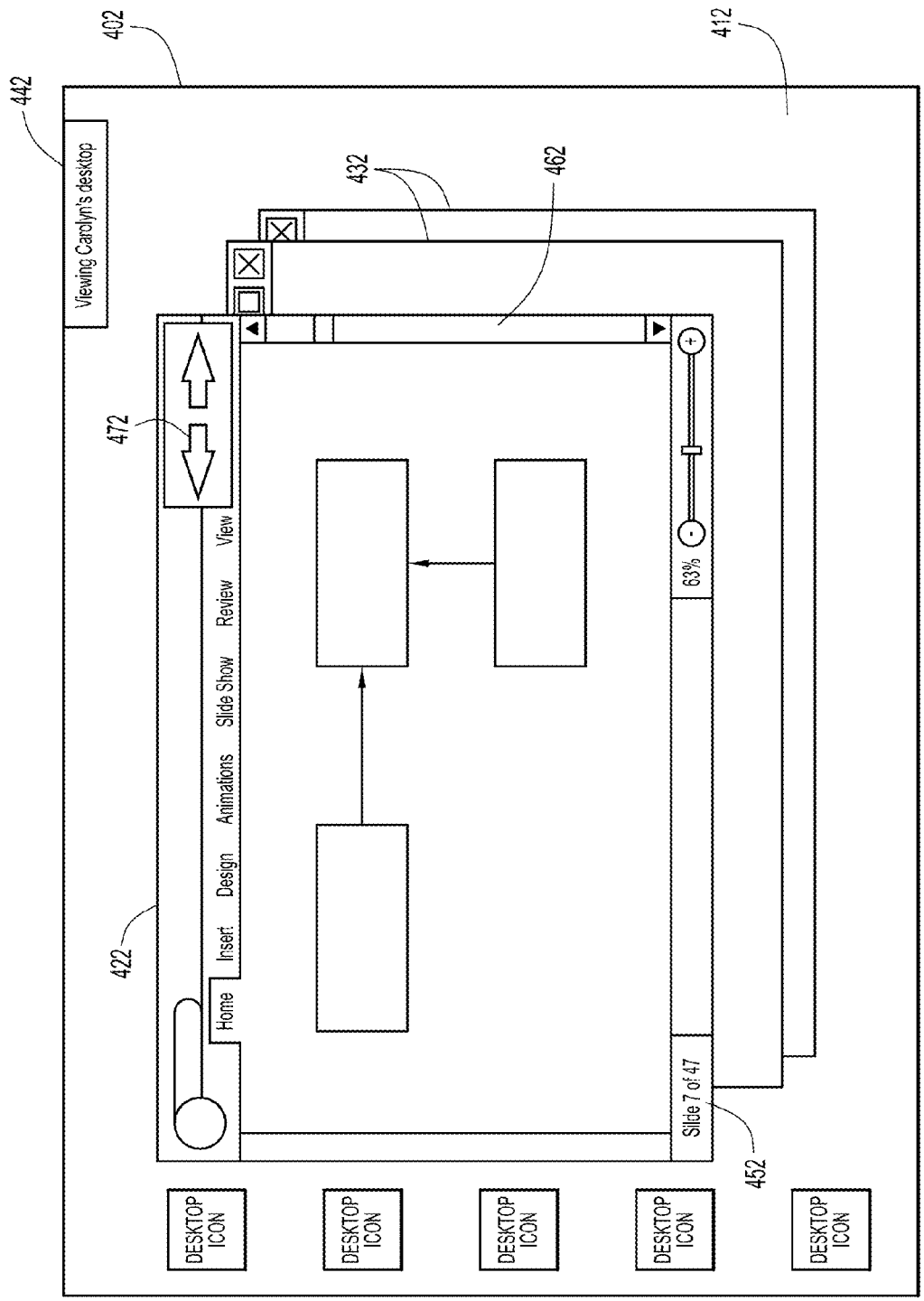
FIG. 4B is a simulated screenshot from a second attendee's device using the desktop sharing system to view yet another page from the shared document that is different from the pages simultaneously being displayed on the presenter's device and the other attendee's device.

Screenshot 402, shown in FIG. 4B, shows the user interface on attendee device 120b, which is displaying a different page of the shared document. The display of attendee device 120b shows desktop background 412 with shared windows 422 and 432. Shared window 422 contains the document that is currently being actively shared. Sharing indicator 442 shows that attendee device 120*b* is displaying the shared desktop from presenter device 110. Page counter 452 in window 422 indicates which page is currently being displayed on attendee device 120*b*, which is different from the page displayed on attendee device 120*a*. User interface elements such as scroll bar 462 and previous/next page buttons 472 allow attendee device 120*b* to request a specific page of the shared document from presenter device 110.

Figure 4C:
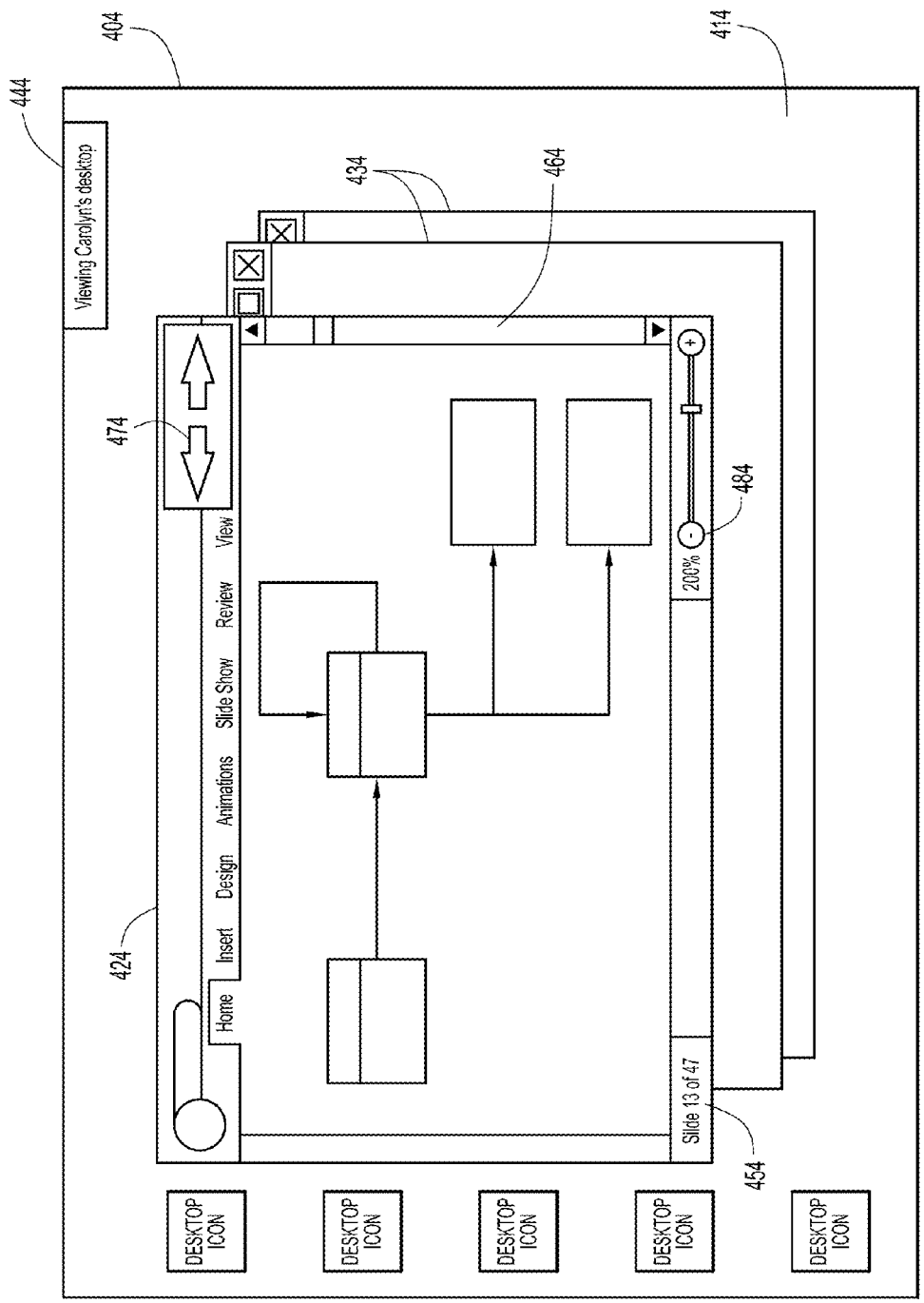
FIG. 4C is a simulated screenshot from an attendee's device using the desktop sharing system to view a magnified page from the shared document.

Screenshot 404, shown in FIG. 4C, shows the user interface on attendee device 120*c*, which is displaying a magnified portion of the shared document. The display of attendee device 120*c* shows desktop background 414 with shared windows 424 and 434. Shared window 424 contains the document that is currently being actively shared. Sharing indicator 444 shows that attendee device 120*c* is displaying the shared desktop from presenter device 110. Page counter 454 in window 424 indicates which page is currently being displayed on attendee device 120*c*. User interface elements such as scroll bar 464 and previous/next page buttons 474 allow attendee device 120*c* to request a specific page of the shared document form presenter device 110. In this example, attendee device 120*c* is viewing a portion of the same page as attendee device 120*a* (shown in FIG. 4A), but at 200% magnification, as shown by magnification bar 484.

Figure 3:
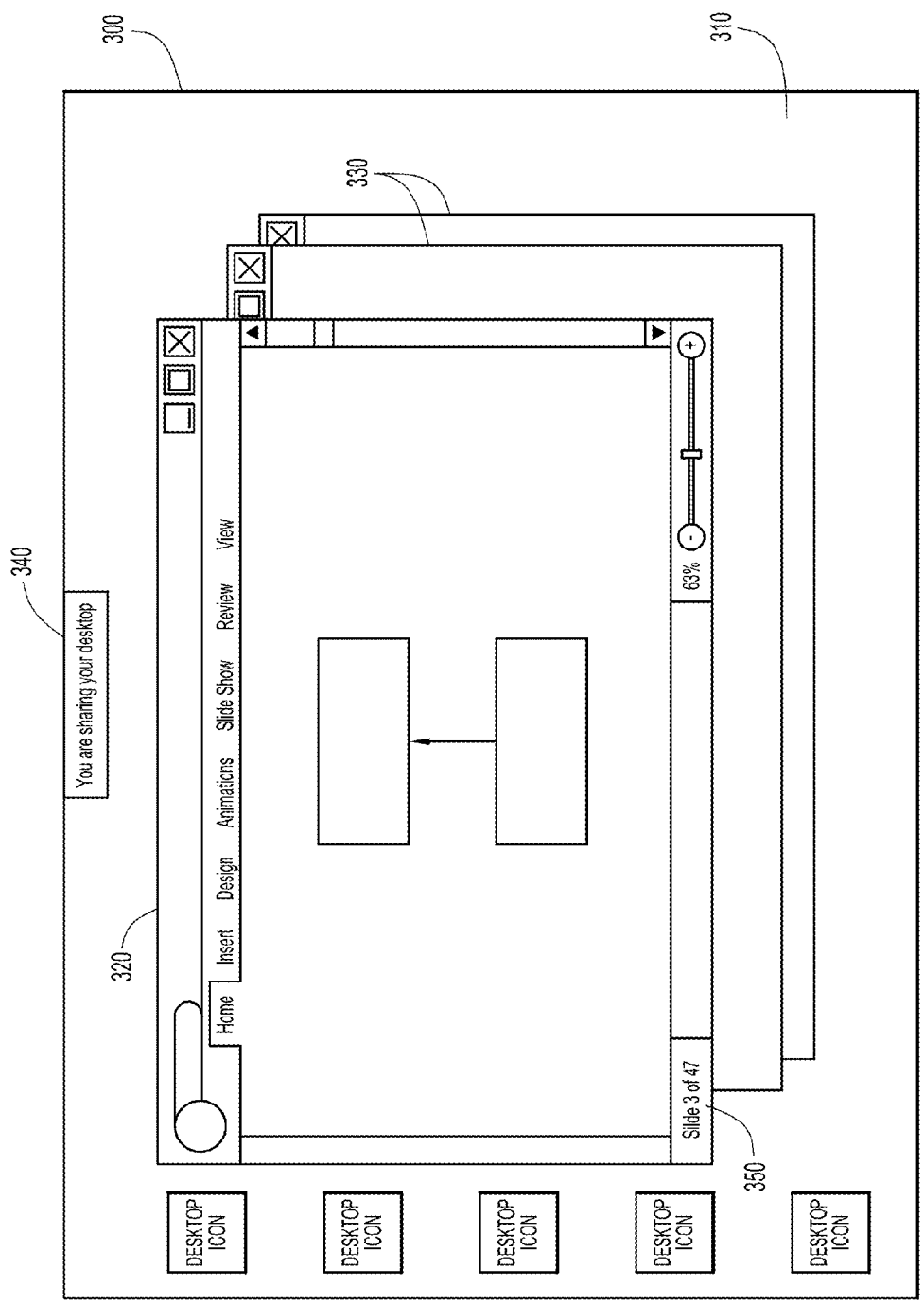
FIG. 3 is a simulated screenshot from the presenter's device sharing a document using the desktop sharing system.

In the training session example, FIG. 3 represents the display of presenter Carolyn's computer in the desktop sharing session, and FIGS. 4A-4C represent the displays that are shown to James, Harold, and Tom, respectively, at the same time. Carolyn's screen shows that she is sharing her desktop and the active window shows that she is currently talking about the third slide of her forty-seven slide Power Point document. On each of James's, Harold's, and Tom's screens, there is an indication that it is Carolyn's desktop that is displayed, including the window with the presentation document. Each of them can navigate through the slides of Carolyn's presentation by using either the scroll bar or the forward/back buttons on the window with the presentation.

In this specific example, James has skipped ahead to the thirteenth slide, as shown in FIG. 4A, and is looking at an image of the thirteenth slide while Carolyn is still talking about the third slide. Harold, in FIG. 4B, has skipped ahead of Carolyn's talk to the seventh slide. He is able to navigate the slides and view images of the slides separately from both Carolyn and James. FIG. 4C shows that Tom has magnified a portion of the thirteenth slide to get a better view of a chart in that slide. While Tom is being shown the same slide as Harold, the sharing system treats it as a separate page image, since merely magnifying the page image that Harold's computer is displaying would lead to undesired pixelation of the chart. Instead, Carolyn's computer uses the built-in capabilities of the Power Point application to magnify the slide, render the magnified slide as a new page image, and send the new image of the magnified slide to Tom.

Figure 5A:
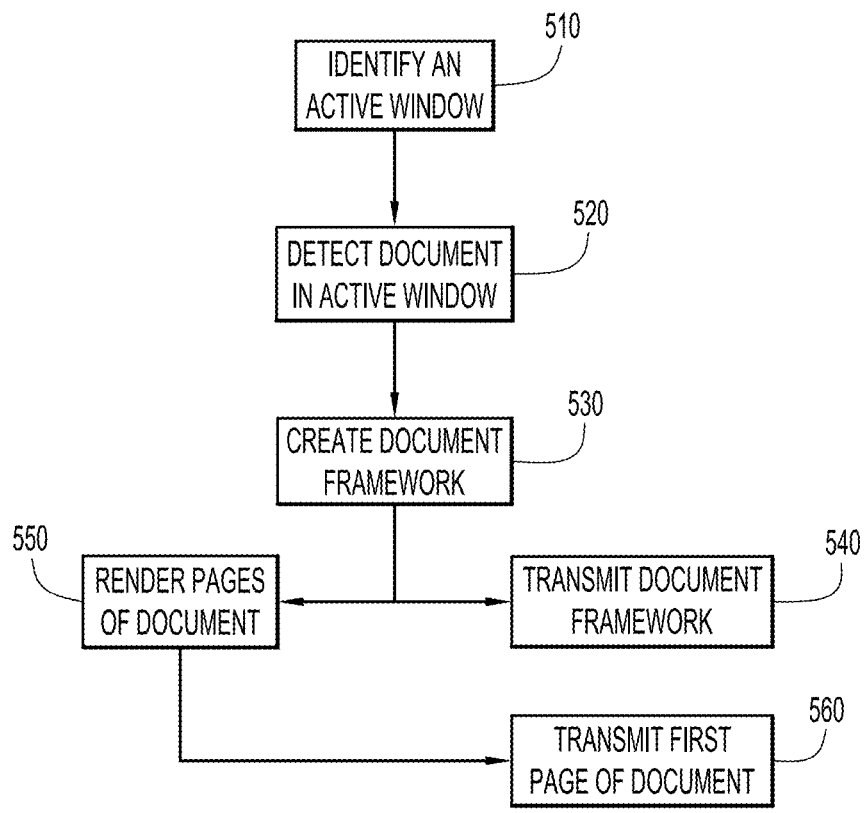
FIG. 5A is a flowchart showing the initial steps of sharing a document in the desktop sharing system.

Referring to FIG. 5A, a flow chart is shown that describes an example of sharing a document through sharing system 100 in a sharing session between presenter device 110 and at least one attendee device 120 and/or server 130. The sharing session may include any number of participants. One example provides for a desktop sharing session, but other types of sharing sessions may be used. In the desktop sharing session, active window detection logic 210 identifies an active window 320 at step 510. Once active window 320 is selected, document sensitive logic 220 detects if a shared document is displaying in the window in step 520, and finds the file path if there is a document displaying in active window 320. In step 530, document parse and render logic 230 creates a framework of the shared document that describes the shared document as a collection of pages. The document may already be divided into logical pages (e.g., slides of a presentation, pages in a word processing document, etc.), or it may need to be divided into pages by logic 230. At this point in the process, presenter device 110 can begin sending information to attendee devices 120 as part of the sharing session.

In step 540, presenter device 110 transmits the framework to any attendee device 120 or server 130 that is part of the sharing session. The framework describes the shared document including how many total pages the document contains and how it is divided into pages. Once presenter device 110 is ready to begin sharing the information in the shared document, logic 230 begins to render each of the pages into page images in step 550. After the first page that will be shared is rendered to a page image, it is transmitted to attendee devices 120 and/or server 130 in step 560. In some examples, the framework is sent at the same time as the first page image. Not all of the pages need to be rendered before an attendee device 120 can start viewing the shared document. Additionally, the pages do not need to be rendered in the order that they appear in the original document. Four different examples of modes of transmitting the rendered page images will be discussed further below with reference to FIGS. 8-11.

Figure 5B:
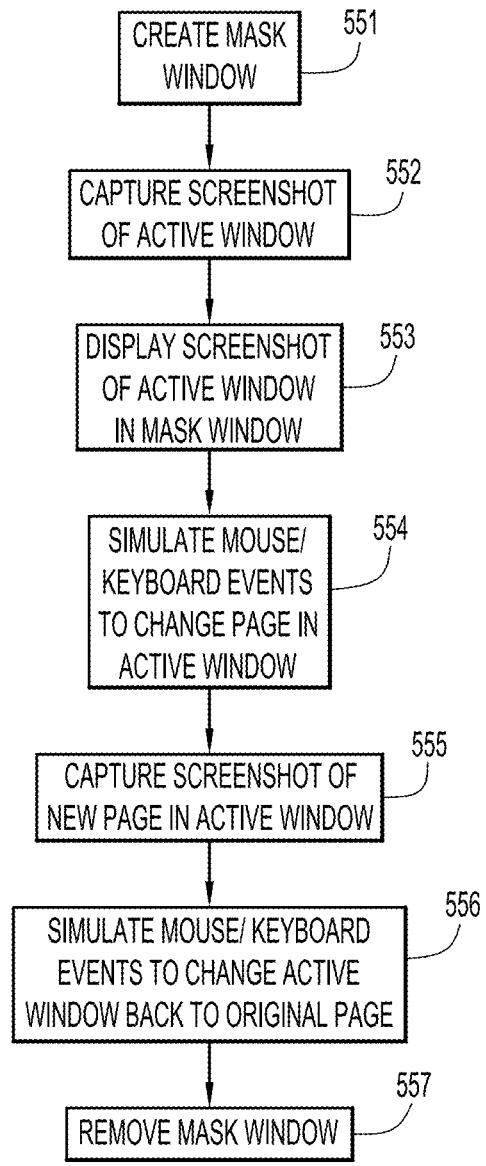
FIG. 5B is a flowchart showing one example of rendering pages of a shared document to page images.

FIG. 5B shows one example of how presenter device 110 renders a page from the shared document without disrupting the display that the presenter sees. In step 551, presenter device 110 creates a mask window over active window 320. Presenter device 110 creates a screenshot of active window 320 at step 552 and displays the screenshot in the mask window at step 553. At this point the mask window hides active window 320, such that the presenter does not see any changes related to rendering other page images. In step 554, presenter device 110 simulates keyboard and/or mouse events on standard user interface elements (e.g., scrollbar 360, etc.) to change the page that hidden, active window 320 would display. Presenter device 110 captures a screenshot of the new page in active window 320 at step 555. After the new page has been rendered, presenter device may simulate mouse and/or keyboard events at step 556 to change active window 320 back to the original page, matching the image displayed in the mask window. Once active window 320 displays the same content as the mask window, presenter device removes the mask window so that the presenter sees active window 320 again.

In another example, the mask window is not destroyed, but is made transparent and inactive (i.e., passing keyboard/mouse events through to active window 320). In yet another example, screen captures of multiple pages may be made by looping through steps 554 and 555 before returning to the original page of the document. Since the process above is very short, not longer than several milliseconds, the presenter does not see any operation in active window 320. If the presenter wants to operate active window 320 while presenter device 110 is rendering other pages to page images, presenter device 110 will record the input and terminate the rendering process as soon as possible, then transmit the presenter's input to active window 320.

For an example of creating a mask window, consider the screenshots of Carolyn's computer in FIG. 3 and Harold's computer in 4A. Active window 320 shows the Carolyn's view showing the third slide of the shared document. In order to render an image of window 420, which shows the thirteenth slide, Carolyn's computer first takes a static image of window 320 and superimposes in a window on top of window 320. After the static image is hiding window 320, Carolyn's computer scrolls forward ten slides, so that window 320 shows the thirteenth slide (i.e., it looks like window 420). Carolyn's computer takes a screen capture of the active window while it looks like window 420, and then scrolls back ten slides to return the active window to the third slide. After the active window is back on the third slide, it looks like the window in 320, and has the mask window on top of it that looks exactly the same. At this point, Carolyn's computer can remove the mask window without Carolyn noticing any difference in the display.

Once each attendee device 120 has received the initial page of the shared document, the presenter may begin talking about the document. The pace of the presentation depends on the presenter, but some attendees may find the pace too fast or too slow. In some cases, an attendee may wish to skip forward and view subsequent pages. In other cases, an attendee may want to linger on a particular page or revisit a previous page that the presenter has finished talking about. After presenter device 110 transmits the framework of the shared document, each attendee device 120 may browse forward or back through the page images of the shared document using standard user interface elements (e.g., scroll bar 460, buttons 470, etc.).

Figure 5C:
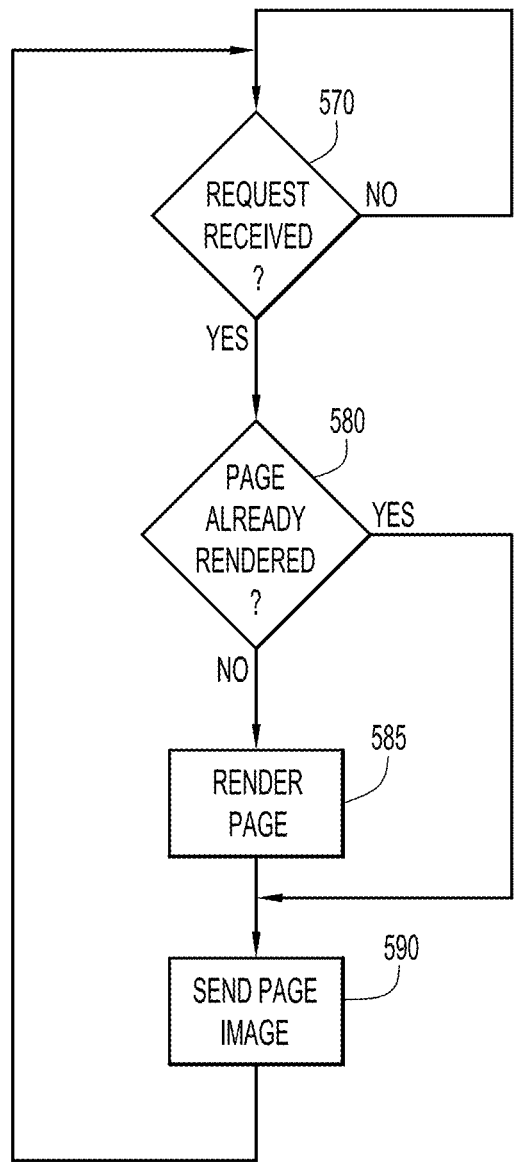
FIG. 5C is a flowchart showing additional steps of sharing a document in the desktop sharing system.

When attendee device 120 wants to browse to a page which it has not yet received, it sends a request to presenter device 110. FIG. 5C shows one example of how presenter device 110 processes a request for a page. Presenter device 110 receives a request for a page of the shared document at step 570. Presenter device 110 determines if the page has already been rendered and is cached. If presenter device 110 has already rendered the page into a page image and maintained a cached copy of the desired page image, as determined at step 580, then it proceeds to step 590 and sends the page image to the attendee device that sent the request. If presenter device 110 does not have a cached copy of the page image, then it must render the page to a page image at step 585 before proceeding to send the page image at step 590. After send the requested page image, the process loops back to step 570 and waits for another request.

Figure 6A:
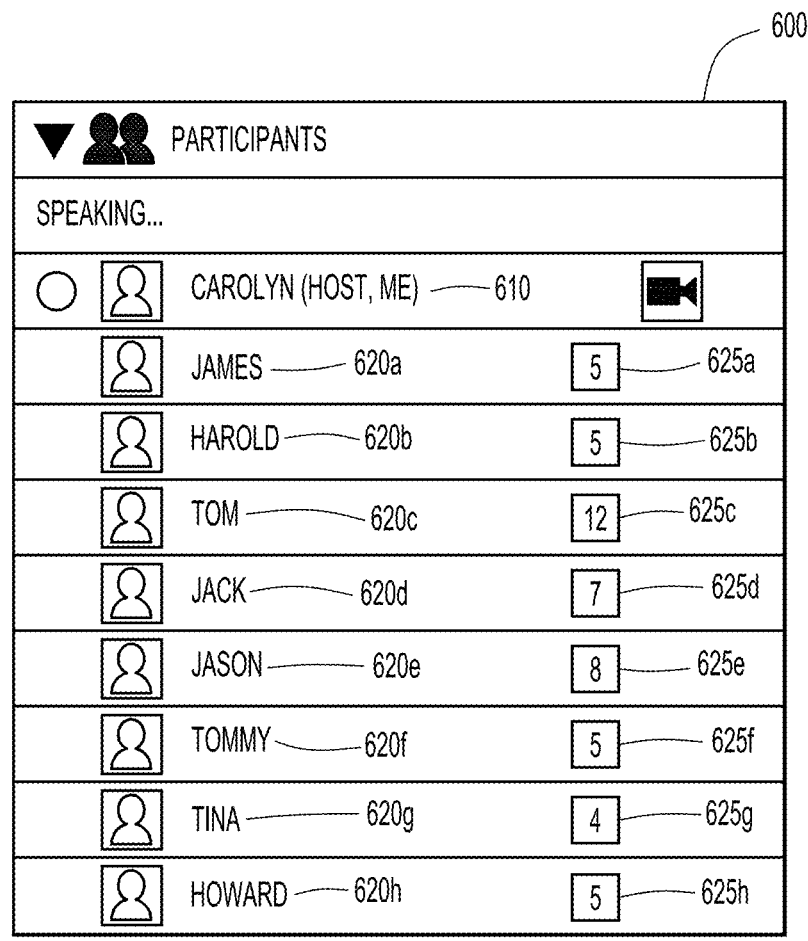
FIG. 6A is an interface on the presenter's device listing each attendee and which page they are currently viewing.

Because each of the attendee devices 120 may be displaying a different page, the presenter may want some feedback on which page each attendee is viewing. FIG. 6A shows one example of attendee view status presentation 600, which allows the presenter to see who is participating in the sharing session, and what page they are currently viewing. For this example of a desktop sharing session, attendee view status presentation 600 includes a listing of the participants' names, such as presenter name 610 and attendee names 620a-h. Beside each of the attendee names 620a-h is a page status indication 625a-h that indicates the page number that attendee device is currently displaying.

Figure 6B:
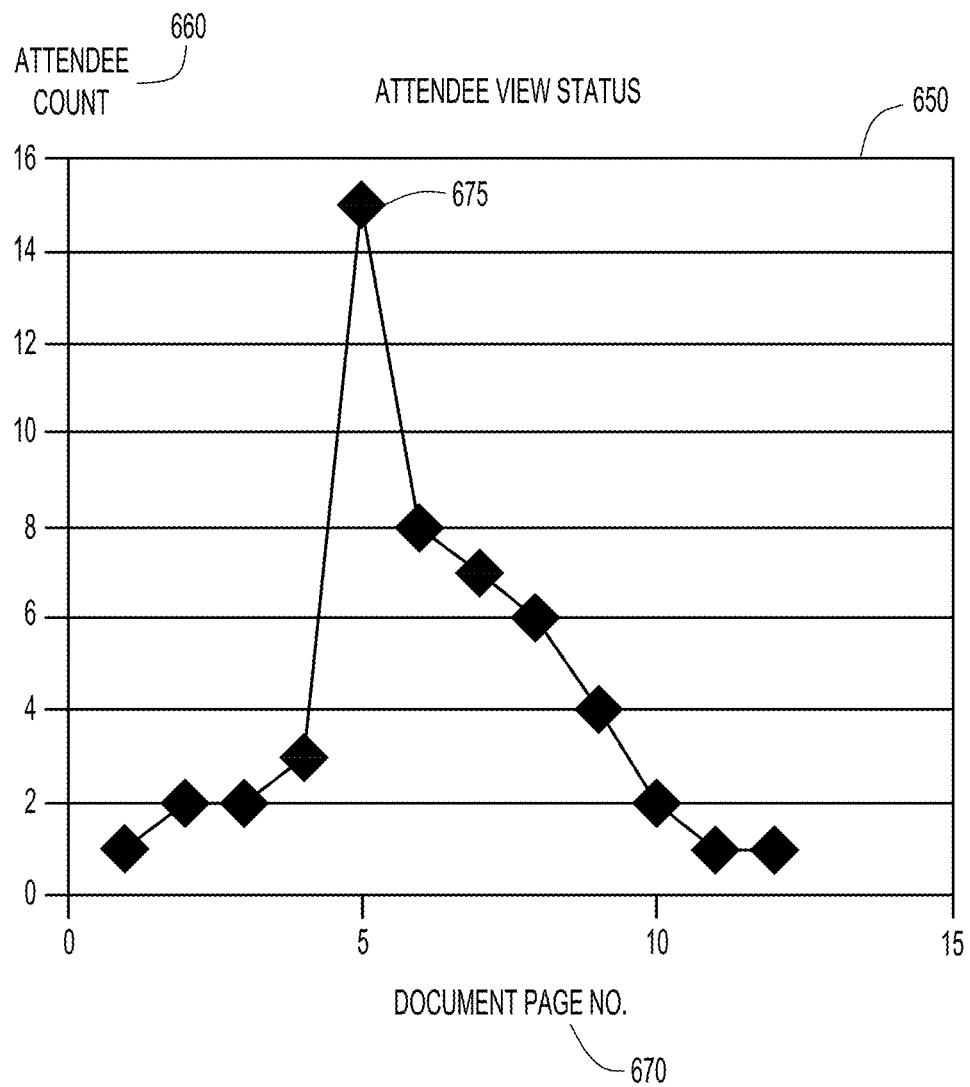
FIG. 6B is an interface on the presenter's device showing a graph of how many attendees are viewing each page in the shared document.

Particularly in cases where the participant list is long, the presenter may not want to see which page each individual attendee is viewing. Instead, the presenter may prefer to see a statistical representation without individual names. One example of a statistical representation is shown in FIG. 6B as scatter chart 650. In this example, scatter chart 650 graphs the number of attendees viewing a page 660 as a function of the page they are viewing 670.

Using FIGS. 6A and 6B in the specific example of presenter Carolyn's training session, more people have joined the training/desktop sharing session. Specifically in FIG. 6A, Jack, Jason, Tommy, Tina, and Howard have joined James, Harold, and Tom. Each of these attendees' computers sends Carolyn's computer a message indicating what page they are viewing. Carolyn's computer compiles these messages and creates a display that shows Carolyn which person is viewing which slide of the presentation (i.e., James is viewing the fifth slide, Tom is viewing the twelfth slide, Tina is viewing the fourth slide, etc.). In the specific example shown in FIG. 6B, fifty-two people have joined Carolyn's training session, such that a list of individuals would be prohibitively long. In this case, Carolyn's computer compiles all of the view status messages from the attendees' computers and creates a chart showing the number of people viewing each page (i.e., two people are viewing the second slide, fifteen people are viewing the fifth slide, four people are viewing the ninth slide, etc.).

In addition to providing a visible indication of the pages that attendees are viewing, presentation 600 and scatter chart 650 may include a way for the presenter to directly navigate to a page that appears to be of interest in the shared document. In one example, if the presenter clicks on page status indication 625a, window 320 on presenter device 110 would display the same page as the one indicated in 625a. In another example, the presenter may click on a point 675 in scatter chart 650 that shows the page where the most attendees are viewing. In this example, window 320 would display the page corresponding to point 675. Navigating to a page in this manner is similar to a hyperlink where selecting an indicator or icon causes active window 320 to jump to a specific page associated with that indicator or icon. In response to receiving the selection of the indicator or icon, presenter device 110 alters the display of window 320 to switch from the page that it was displaying to the attendee-viewed page associated with the indicator or icon.

Continuing the examples from FIGS. 6A and 6B, Carolyn may find it useful to be able to jump to a specific page that the attendees are interested in. For example, if Tom asks a specific question and references something on the slide he is viewing, Carolyn can click on the page number next to his name, and then she can be sure that she is seeing the same slide that Tom is seeing. In another context, if Carolyn is giving her presentation and has moved on to the seventh slide, she may notice in the chart shown in FIG. 6B that many people are still viewing the fifth slide. In this case, Carolyn may want to click on the chart and redirect her presentation to spend more time on the fifth slide.

Figure 7:
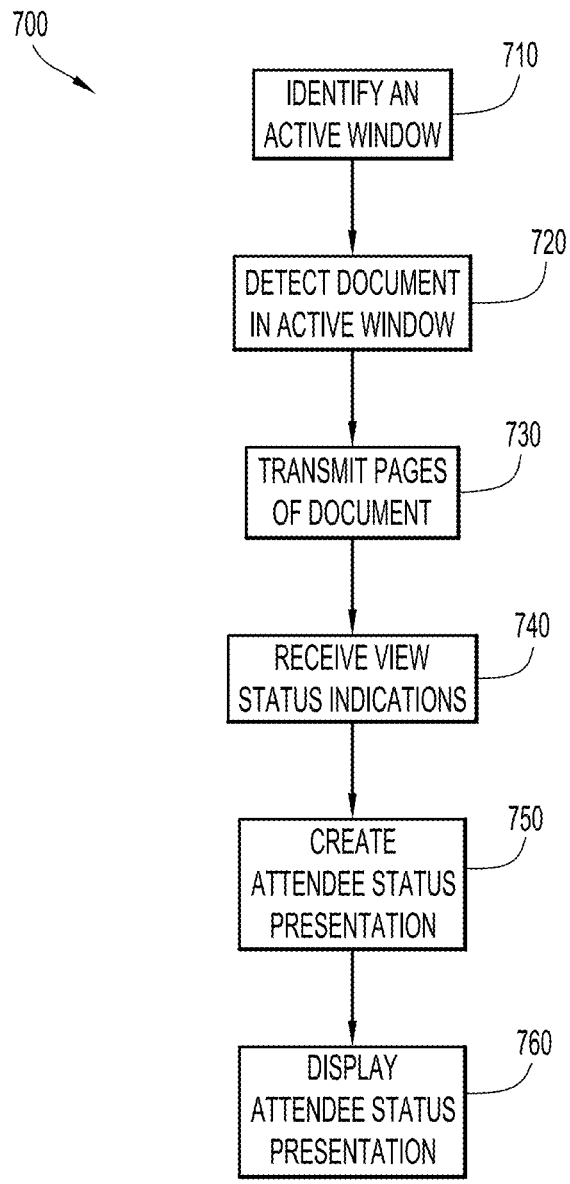
FIG. 7 is a flowchart for giving the presenter feedback on which page the attendees are viewing.

FIG. 7 shows one example of process 700, by which presenter device 110 collects page status indications from attendee devices 120 in order to display attendee view status indication 600 and/or scatter chart 650. Process 700 begins, similarly to the process described in FIG. 5A, with identifying an active window in step 710. In step 720, presenter device 110 detects the document displayed in the active window. Presenter device 110 transmits the framework and page images of the shared document to the attendee devices 120 at step 730. The explicit steps of dividing the shared document into pages and rendering the pages to page images are not depicted in FIG. 7, but may be included in the process.

Once attendee devices 120 receive the framework and at least one of the page images, they begin to send view status indications back to presenter device 110, which receives them in step 740. Presenter device 110 collates all of the view status indications that it receives from attendee devices 120 and, in step 750, creates an attendee view status presentation, such as presentation 600 shown in FIG. 6A and/or scatter chart 650 shown in FIG. 6B. After creating the attendee view status presentation, presenter device 110 displays the attendee view status presentation at step 760. While the attendee view status presentation has been described on presenter device 110, it is not limited to presenter device 110, and may be created and/or displayed on any attendee device 120 or on server 130.

Referring now to FIGS. 8-11, various modes for transferring pages from presenter device 110 to attendee devices 120 are possible. The four modes described below include an Active Mode, a Passive Mode, a Background Mode, and a Server Mediated Mode. The timing that each page is rendered to a page image and the timing that each page image is sent to an attendee device changes with each mode. While each mode will be discussed separately, sharing system 100 may combine or switch modes depending on the needs and capabilities of the participants and the hardware that implements sharing system 100. For example, a sharing session may begin sharing a document in Active Mode to ensure that everyone starts on the correct page, but may transition to Passive Mode after the presentation gets started. Further combinations are described below within the context of individual modes.

Figure 8:
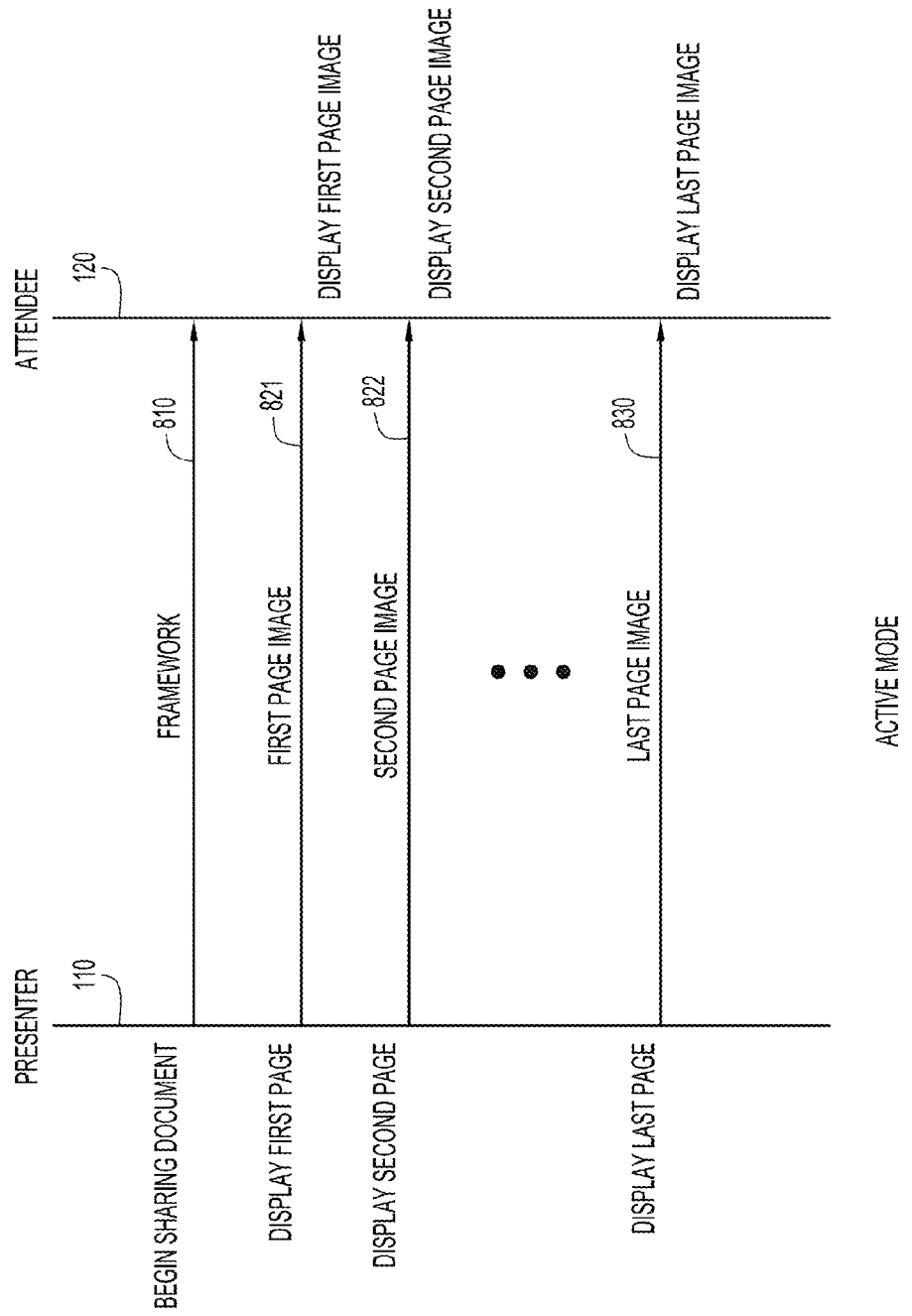
FIG. 8 is a timing diagram for the active mode of sharing a document in the desktop sharing system.

FIG. 8 shows an Active Mode in which the presenter pushes each page image to the attendees in response to the presenter moving on to that page. The presenter begins the presentation by sharing a document. Framework 810 for the shared document is sent from presenter device 110 to attendee device 120. While only one attendee device 120 is shown in FIG. 8, any number of attendee devices may participate in the sharing session. When presenter device 110 begins displaying the first page of the shared document, presenter device 110 sends page image 821 to attendee device 120. Once the presenter changes window 320 to display the second page of the shared document, presenter device 110 displays the second page, and pushes page image 822 to attendee device 120. In one example, Active Mode continues pushing page images as presenter device displays them all the way through page image 830 of page N, which represents the last page of the shared document.

Figure 9:
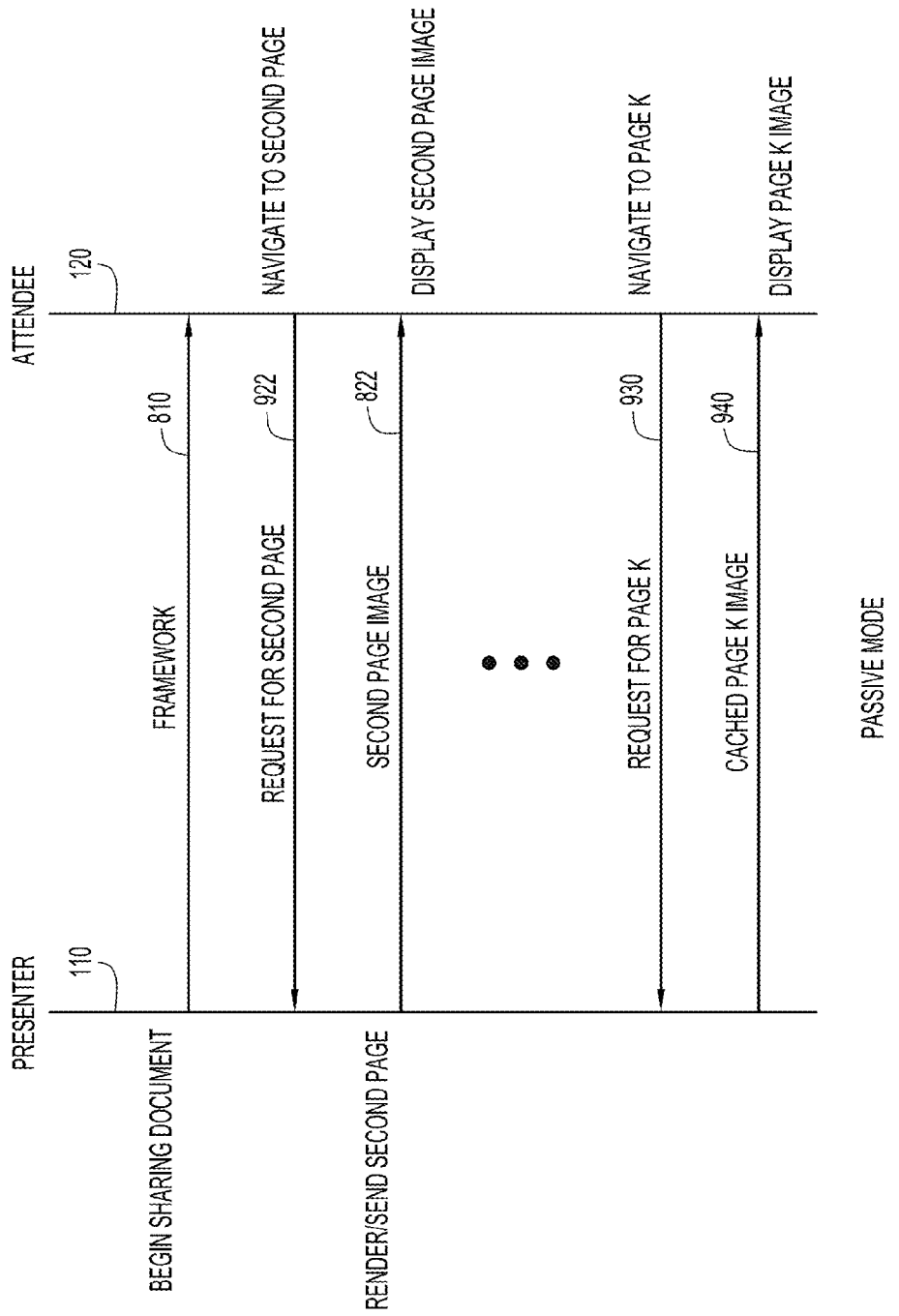
FIG. 9 is a timing diagram showing the passive mode of sharing a document in the desktop sharing system.

Passive Mode, as shown in FIG. 9, may be characterized as a pull mode and allows the attendees to move back and forth between the pages of the shared document by sending requests to pull pages from presenter device 110. The presenter begins sharing a document and framework 810 is sent from presenter device 110 to attendee device 120. When the attendee navigates to the second page. In response to the attendee navigating to the second page with a standard user interface element (e.g., scroll bar 460, previous/next buttons 470, etc.), attendee device 120 sends request 922 to presenter device 110 asking for the image of the second page. Presenter device 110 renders the second page and sends the resulting page image 822 back to attendee device 120, where it is displayed.

At some later time, the attendee may navigate to arbitrary page K, causing attendee device 120 to send request 930 to presenter device 110. Presenter 110 does not necessarily wait to receive a request before rendering a given page. The rendering process may occur in the background at presenter device 110 separate from sending the page images. In this example, presenter device 110 has already rendered page K into a page image and cached the page image. In response to request 930, presenter device 110 transmits cached page image 940, which is displayed on attendee device 120. In another form, presenter device 110 may wait to render page K until attendee device 120 requests it.

Figure 10:
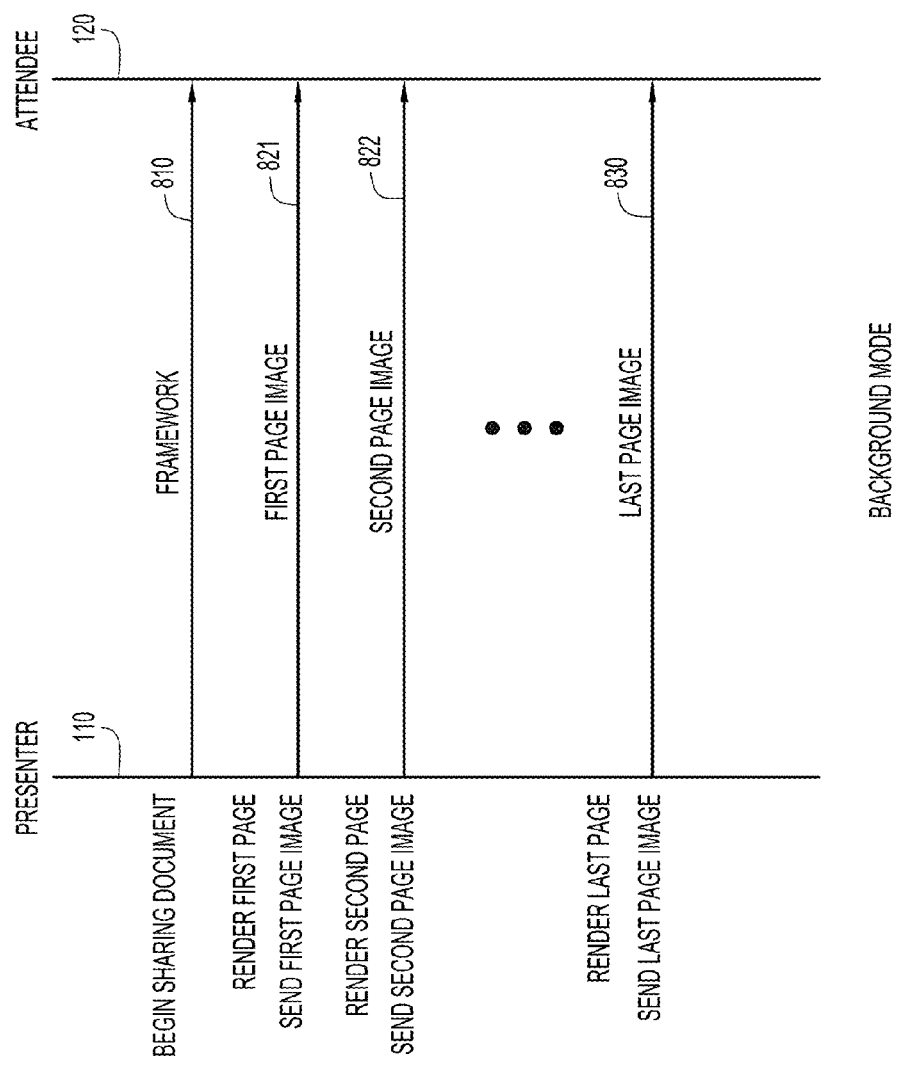
FIG. 10 is a timing diagram showing the background mode of sharing a document in the desktop sharing system.

FIG. 10 shows a Background Mode for pushing page images from presenter device 110 to attendee device 120 after each page is rendered. While both Active Mode and Background Mode may be characterized as "push" modes because they both transmit data to an attendee device without a request, the two push modes differ in the trigger that causes a page image to be sent. The presenter begins sharing a document and presenter device 110 sends framework 910 to attendee device 120. Presenter device 110 then renders the first page of the shared document, which triggers presenter device 110 to send page image 921 to attendee device 120. After the first page is rendered and the corresponding page image is sent, presenter device renders the second page and sends page image 922 to attendee device 120, without attendee device 120 requesting the second page. Presenter device continues rendering pages and sending page images until the last page is rendered and page image 930 is sent to attendee device 120. While one example of the Background Mode has been described in a sequence above, other examples of push modes that change the timing of the specific steps and the trigger are also envisioned. For example, presenter device 110 may render several pages before sending page images along with the framework of the document. In this example, presenter device 110 is triggered to transmit page images only after several pages have been rendered, instead of after each page is rendered.

For the training session example, Carolyn's computer pushes out the first page image in Active Mode at the beginning of the session. If Carolyn presents the material in her presentation quickly, the first several page images may also be pushed with Active Mode since Carolyn's computer may not have time to render and send the page images in Background Mode. In Passive Mode, if Tom is already familiar with the concepts that Carolyn will be talking about in the beginning of the training, then he can request some later slides to get a jump on a topic that he may not know as much about. Similarly, if Jack is only interested in one specific topic, then he can ask for only the slides relating to that topic, and study those slides in more detail. All three of these modes may be used throughout the training session, each one working on a different priority of a common goal. The common goal is to allow James, Harold, and Tom to follow along with Carolyn's presentation and navigate through the shared document as if it were immediately available on their own computers. Active Mode prioritizes each attendee's computer displaying the page that the presenter is currently talking about. Passive Mode prioritizes each attendee's computer displaying the page that the attendee selects. Background Mode prioritizes efficient use of network bandwidth in getting each of the attendees' computers pages that they may display in the future.

Depending on various hardware and human factors (e.g., speed of the presenter's delivery, speed and capacity of each person's computer, speed and capacity of the network, etc.) some of the modes may be unnecessary. In the case of fast computers, fast network connections, and a slow presentation pace, the active mode may never be used after the first page image is sent. Alternatively, in the case of a slow presenter device and a fast presenter pace, such that the presenter device cannot render the page images faster than the presenter talks about them, the background mode may never be used. Additionally, modes may be specifically disabled. For example, if the attendee devices do not have the memory capacity to hold all of the page images of the entire shared document, background mode may be disabled so that the presenter device is not sending page images that the attendee device is not currently displaying.

Figure 11:
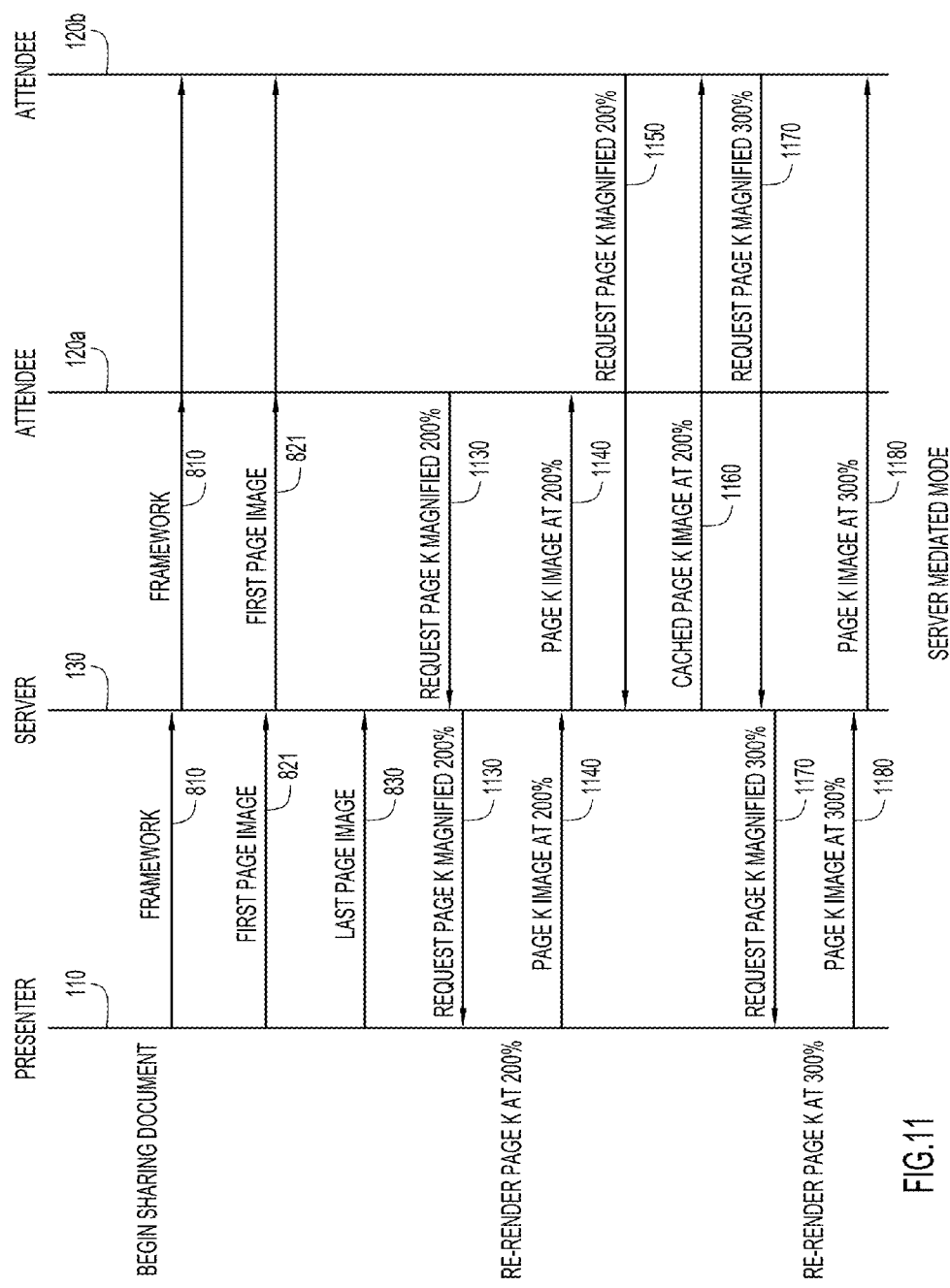
FIG. 11 is a timing diagram showing a server mediated embodiment of attendees viewing a magnified portion of the shared document.

Another example of a mode for transferring page images from presenter device 110 to attendee devices 120*a* and 120*b* is through server 130 in a Server Mediated Mode, shown in FIG. 11. In the Server Mediated Mode, server 130 in effect acts as an attendee device in its communication with presenter device 120, and in effect acts as a presenter device in its communications with attendee devices 120a and 120b. For example, the presenter begins sharing a document and sends framework 810 to server 130, which then forwards it to attendee devices 120a and 120b. Presenter device 110 renders and sends page images to server 130 in any manner, including any or all of the three previously described modes (Active, Passive, Background), and server 130 forwards each page image to attendee devices 120a and 120b starting with page image 821.

FIG. 11 also shows an example of a request for a magnified page image, as well as caching a page image so that it does not need to be rendered again. In this example, attendee device 120a sends request 1130 for a specific page magnified at 200% to server 130. Server 130 forwards request 1130 to presenter device 110, which re-renders the requested page at 200% and sends the magnified page image 1140 back to server 130. Presenter device may re-render a page at a higher magnification by using standard user elements, such as a magnification bar, that may be a part of the application that displays the shared document on presenter device 110. At a later time, attendee device 120b may also send request 1150 for the same page at the same 200% magnification. After receiving request 1150, server 130 determines that presenter device 110 has already re-rendered that page, and server 130 has a cached page image corresponding to that request. Server 130 responds to request 1150 by sending the cached page image 1160 to attendee device 120b so that presenter device does not need to re-render the page again.

In one example, the attendee using attendee device 120b wants to view the same page at even greater magnification (e.g., 300%), and sends request 1170 to server 130. Because server 130 does not have a cached copy of that page at that magnification, it forwards request 1170 to presenter device 110. Presenter device 110 re-renders the page at 300% magnification and sends the page image 1180 back to server 130, which forwards it to attendee device 120b.

Continuing the training session example with respect to FIG. 11, Carolyn's computer may be too slow to handle all of the requests that come in for new pages without excessive delays. In this case, an intermediary server is employed to help with caching the document and responding to the requests. Specifically, one of the slides in Carolyn's presentation may contain a chart with relatively small writing. Wanting to study the chart in more detail, James sends a request for a magnified image of the chart. The intermediary server takes the request, and forwards it to Carolyn's computer to re-render the chart magnified at a high resolution. The server forwards the magnified image of the chart back to James's computer, and stores a copy so that Carolyn's computer does not need to re-render the same chart again. At some later time, Harold also wants to view the chart in more detail and asks for a magnified image of the chart. This time, the server does not need to forward the request to Carolyn's computer, since the server already has a copy of the magnified image that it can send back to Harold's computer. However, Harold still cannot see the fine details of the chart and requests an image of the chart magnified even more. Since the server does not have the image magnified even more, it has to forward this request to Carolyn's computer for a re-rendered image of the chart magnified further.

The above description provides an example of sharing any type of document in a shared desktop environment. Sharing system 100 allows for a faster start to sharing a document than uploading the entire document, because only the framework and the initial page need to be transmitted before the end users (i.e. attendees) can begin interacting with the shared document. Additionally, because the shared document does not need to be uploaded previously, a sharing session may share unexpected, impromptu documents of virtually any type, without any previous actions by any participant in the sharing session. Sharing system 100 also provides for visualization of which attendee devices are displaying which page of the shared device, as well as the capability to quickly jump to a specific page that one or more attendee devices are displaying. While the described example show presenter device 110 performing all of the processing, other computing systems (i.e., attendee devices, servers, etc.) may handle some of the rendering, caching, transmitting, and other computing processes.

The above description is intended by way of example only.

What is claimed is:

1. A method comprising:
    identifying an active document sharing window displayed on a presenter device in a sharing session between the presenter device and at least one attendee device;
    detecting a shared document displayed in the active document sharing window;
    creating a framework of the shared document by hiding the active document sharing window behind a masking window and dividing the shared document into a plurality of pages, the framework comprising information about the plurality of pages in the shared document;
    transmitting the framework to each of the attendee devices without transmitting the entire shared document, such that the at least one attendee device can request a specific page of the plurality of pages in the shared document;
    rendering the plurality of pages to a plurality of page images; and
    transmitting a first page image of the plurality of page images to the at least one attendee device.

2. The method of claim 1, wherein creating a framework of the shared document further comprises using a standard user interface element to divide the shared document into the plurality of pages.

3. The method of claim 2, wherein the standard user interface element comprises a scroll bar, a next page button, or a previous page button.

4. The method of claim 1, wherein rendering the plurality of pages to a plurality of page images comprises creating screen captures of the plurality of pages in the shared document.

5. The method of claim 1, further comprising transmitting at least a second page image in response to receiving, from the at least one attendee device, a request for at least the second page image.

6. The method of claim 5, wherein the second page image comprises a magnified portion of one of the plurality of pages.

7. The method of claim 5, wherein the second page image is rendered after receiving the request for the second page image.

8. The method of claim 1, further comprising transmitting at least a second page image without receiving, from the at least one attendee device, a request for the second page image.

9. The method of claim 1, further comprising displaying the first page image in the masking window on the presenter device while rendering the plurality of pages to the plurality of page images.

10. The method of claim 9, further comprising removing the masking window after one or more of the plurality of pages is rendered to the plurality of page images.

11. The method of claim 1, further comprising identifying the active document window according to one or more window attributes of a plurality of document windows on the presenter device.

12. The method of claim 11, wherein the one or more window attributes include a window size, a visible window size, a measure of activity in a predetermined period of time.

13. An apparatus comprising:
a network interface unit configured to transmit and receive messages associated with a sharing session between the apparatus and at least one attendee device;
a display configured to display document sharing windows of the sharing session; and
a processor coupled to the network interface unit and the display, and configured to:
identify an active document sharing window displayed on the display;
detect a shared document displayed in the active document sharing window;
create a framework of the shared document by hiding the active document sharing window behind a masking window and dividing the shared document into a plurality of pages, the framework comprising information about the plurality of pages in the shared document;
render the plurality of pages to a plurality of page images; and
transmit the framework of the shared document and at least a first page image of the plurality of page images to each of the attendee devices without transmitting the entire shared document, such that the at least one attendee device can request a specific page of the plurality of pages in the shared document.

14. The apparatus of claim 13, wherein the processor is configured to create the framework of the shared document by using a standard user interface element to divide the shared document into the plurality of pages.

15. The apparatus of claim 14, wherein the standard user interface element comprises a scroll bar, a next page button, or a previous page button.

16. The apparatus of claim 13, wherein the processor is configured to render the plurality of pages to a plurality of page images by creating screen captures of the plurality of pages in the shared document.

17. The apparatus of claim 13, wherein the processor is further configured to transmit at least a second page image in response to receiving, from the at least one attendee device, a request for at least the second page image.

18. The apparatus of claim 17, wherein the second page image comprises a magnified portion of one of the plurality of pages.

19. The apparatus of claim 13, wherein the processor is further configured to transmit at least a second page image without receiving, from the at least one attendee device, a request for the second page image.

20. One or more non-transitory computer readable storage media encoded with software comprising computer executable instructions and when the software is executed operable to cause a processor to:
identify an active document sharing window displayed on a presenter device in a sharing session between the presenter device and at least one attendee device;
detect a shared document displayed in the active document sharing window;
create a framework of the shared document by hiding the active document sharing window behind a masking window and dividing the shared document into a plurality of pages, the framework comprising information about the plurality of pages in the shared document; and
render the plurality of pages to a plurality of page images;
transmit the framework of the shared document and at least a first page image of the plurality of page images to each of the attendee devices without transmitting the entire shared document, such that the at least one attendee device can request a specific page of the plurality of pages in the shared document.

21. The computer readable storage media of claim 20, wherein the computer executable instructions operable to cause the processor to create the framework comprise instructions to use a standard user interface element to divide the shared document into the plurality of pages.

22. The computer readable storage media of claim 21, wherein the standard user interface element comprises a scroll bar, a next page button, or a previous page button.

23. The computer readable storage media of claim 20, wherein the computer executable instructions operable to cause the processor to render the plurality of pages to a plurality of page images comprise instructions to create screen captures of the plurality of pages in the shared document.

24. The computer readable storage media of claim 20, further comprising computer executable instructions operable to cause the processor to transmit at least a second page image in response to receiving, from the at least one attendee device, a request for at least the second page image.

25. The computer readable storage media of claim 24, wherein the second page image comprises a magnified portion of one of the plurality of pages.

26. The computer readable storage media of claim 20, further comprising computer executable instructions operable to cause the processor to transmit at least a second page image without receiving, from the at least one attendee device, a request for the second page image.

* * * * *